R. J. MITCHELL.
LOCOMOTIVE ASH PAN.
APPLICATION FILED AUG. 14, 1909.
946,553.  Patented Jan. 18, 1910.
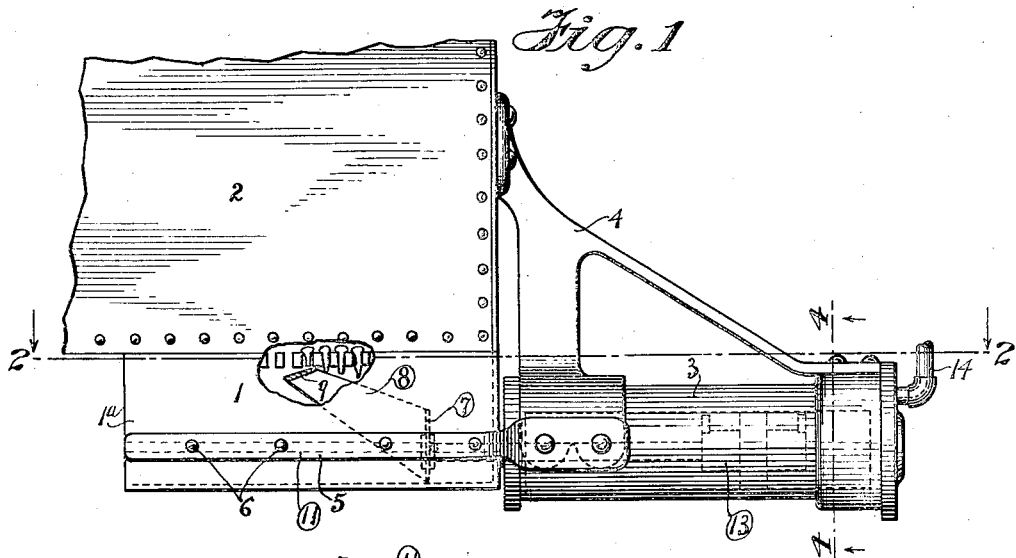
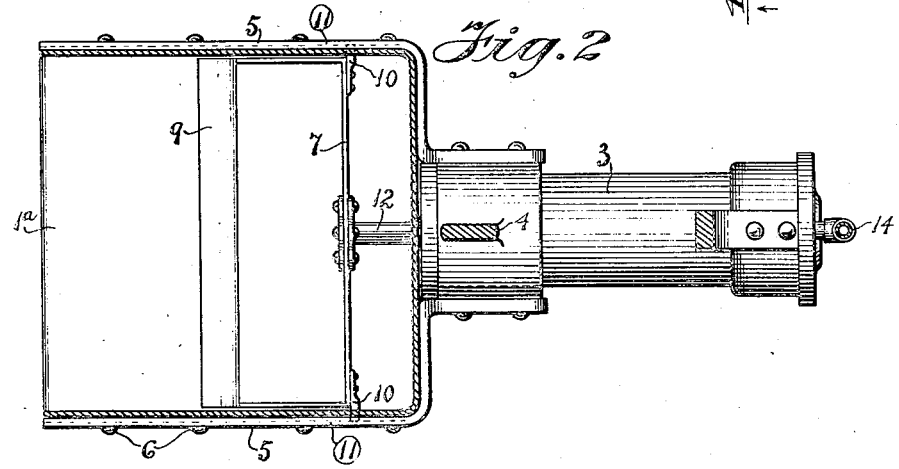
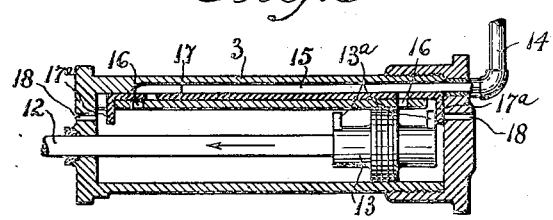
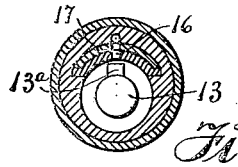
WITNESSES:
Chas. F. Clagett
O. Curtis
INVENTOR
Robert J. Mitchell
BY
Ches. B. Billman
ATTORNEY

UNITED STATES PATENT OFFICE.

ROBERT J. MITCHELL, OF MARION, OHIO.

LOCOMOTIVE ASH-PAN.

946,553.　　　　Specification of Letters Patent.　　Patented Jan. 18, 1910.

Application filed August 14, 1909. Serial No. 512,787.

*To all whom it may concern:*

Be it known that I, ROBERT J. MITCHELL, a citizen of the United States, residing at Marion, in the county of Marion and State of Ohio, have invented certain new and useful Improvements in Locomotive Ash-Pans, of which the following is a specification.

My invention relates to improvements in locomotive ash-pans, and, more particularly, to fluid-operated ash-pan cleaning mechanism for use in connection with an ordinary locomotive and designed to be operated by a suitable operating fluid, such as steam, compressed air, or the like.

The primary object of the invention is to provide a generally improved device of this class which will be exceedingly simple in construction, cheap of manufacture, efficient in use, and much better adapted for its intended purpose than any other device of the same class with which I am acquainted.

With the above mentioned ends in view, the invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1 is a side elevation of the improved device attached to the fire-box portion of a locomotive. Fig. 2, a view, partly in horizontal section and partly in top plan, taken on line 2,—2, of Fig. 1. Fig. 3, a central sectional view of the fluid operating cylinder. Fig. 4, a cross sectional view of the same, taken through the line 4,—4, of Fig. 1.

Similar numerals of reference designate like parts through all the figures of the drawings.

The improved ash-pan 1, may be attached and secured beneath the grate-bars or gratings of the fire-box 2, in any suitable and convenient manner, and, in the present instance, is left open at its forward end 1ª, as shown in the drawings.

The fluid cylinder 3, in the present instance, is mounted at the rear of the ash-pan 1, and carried and mounted by means of a bracket 4, secured to the rear of the fire-box 2. The forward end of the cylinder 3, is secured to the ash-pan 1, by means of brace members 5, extending forwardly and secured to the side walls of the ash-pan by means of rivets 6.

A scraper member or cross-head 7, is slidably mounted in the ash-pan 1, and is adapted to impinge upon the bottom portion thereof in the operation of clearing accumulated ashes, and the like, as hereinafter described. The scraper member 7, terminates at its sides 1, in upwardly and forwardly extending supporting arms 8, carrying a transversely disposed clinker cutting bar or member 9, carried just beneath the gratings of the fire-box in the reciprocatory movements of the scraper member for the purpose of impinging against such clinkers and cinders as may extend down through the grate bars and causing such clinkers and cinders to fall into the ash-pan below. The scraper member or cross head 7, is provided at its sides with guide members 10, extending into horizontal guide-slots 11, in the side walls of the ash-pan and the adjacent inner sides of the brace members 5.

The agitator bar or member 9, is preferably disposed at an angle to the plane of the grate-bars as shown and as a means for reciprocating the same, together with the scraper member or cross-head 7, the latter is attached to the piston-rod 12, carried by piston 13, adapted to reciprocate in the cylinder 3 by suitable operating fluid as now described. The operating fluid passes into the cylinder through the medium of a suitable conduit-pipe 14, leading to a horizontal inlet passage 15, of the wall of the cylinder. The operating fluid may be controlled and admitted to the cylinder by means of suitable valves (not shown) in conduit pipe 14, and as a means for admitting the operating fluid into the cylinder for the purpose of reciprocating the piston, together with its attachments, inlet ports 16 are formed in the walls of the cylinder near each end thereof and are adapted to be alternately thrown into and out of communication with the interior of the cylinder and the inlet passage 15 by means of the slide valve 17 provided at its ends with downwardly extending flange-heads 17ª adapted to be alternately engaged by upwardly extending flange heads 13ª of the piston as the latter is reciprocated. The spent operating fluid is adapted to be ejected through outlet ports 18, alternately opened and closed by the flange heads 17ª of the slide valve 17 as the latter is reciprocated.

From the foregoing description taken in connection with the accompanying drawings the operation and advantages of my invention will be readily understood.

Having thus described one of the embodiments of my invention, what I claim and desire to secure by Letters Patent is,—

1. In a locomotive, the combination of a fire-box provided with grate-bars, an ash-pan disposed beneath said grate-bars, and a scraper adapted to reciprocate in said ash-pan and carrying a clinker cutting member adapted to pass beneath the grate-bars of the fire-box and remove the clinkers from the under side of the same when the scraper is reciprocated.

2. In a locomotive, the combination of a fire-box provided with grate-bars, an ash-pan, a cylinder, a piston provided with a rod crrying a scraper, a clinker cutting member carried by said scraper and adapted to pass beneath and remove the clinkers from the under side of said grate-bars when the scraper is reciprocated, and means for reciprocating said scraper and clinker cutting member.

3. In a locomotive, a fire-box provided with gratings, an open ended ash-pan disposed beneath said gratings, a fluid cylinder, a piston carrying a scraper slidable in said ash-pan, and a clinker cutting member arranged to pass beneath and remove the clinkers from the under side of the gratings when the scraper is reciprocated.

4. In a locomotive, a fire-box provided with gratings, an ash-pan disposed beneath said gratings, a cylinder, a piston provided with a rod carrying a scraper in said ash-pan, and arms on said scraper carrying a clinker cutting member disposed beneath said gratings and adapted to remove the clinkers from the underside of the same when the scraper is reciprocated.

5. In a locomotive, an ash-pan, open at its front and having its side walls provided with longitudinal guide slots, a cylinder, a piston carrying a scraper member provided with guides slidable in said guide slots, supporting arms carried by said scraper member, a fire-box provided with gratings above said ash-pan, and a clinker cutting member carried by said supporting arms in front of said scraper member and adapted to pass beneath and remove the clinkers from said gratings when the scraper is reciprocated.

In testimony whereof I have affixed my signature, in presence of two witnesses.

ROBERT J. MITCHELL.

Witnesses:
MARGRET HATTON,
NELLE MITCHELL.